Sept. 27, 1955  D. A. YOUNG  2,718,869
INDICATING MEASURING INSTRUMENTS
Filed Aug. 31, 1950

WITNESSES:
E. A. McCloskey
Wm. L. Groome

INVENTOR
Douglass A. Young.
BY
R. L. Freedman
ATTORNEY

United States Patent Office 2,718,869
Patented Sept. 27, 1955

2,718,869

INDICATING MEASURING INSTRUMENTS

Douglass A. Young, East Orange, N. J., assignor to Westinghouse Electric Corporation, East Pittsburgh, Pa., a corporation of Pennsylvania Application August 31, 1950, Serial No. 182,554

18 Claims. (Cl. 116—129)

This invention relates to indicating measuring instruments, and it has particular relation to a measuring instrument of the type wherein a pointer is mounted for movement with respect to a scale element.

The invention is applicable to measuring instruments having movements designed to respond to various variable quantities, such as mechanical displacement, radiant energy and electrical quantities. The invention may be applied to a portable instrument or to an instrument designed for mounting on a panel or a switchboard. The invention will be discussed particularly for an electrical measuring instrument designed to be mounted on a panel or switchboard and having a pointer which is movable with respect to a scale element through an angle in excess of 180°.

One of the problems presented by measuring instruments is that resulting from parallax. One solution for this problem has been the placement of the pointer and the scale element associated with the pointer in substantially the same plane.

A further problem results from the conventional location of an instrument movement within a protective casing. This casing includes a transparent window through which the pointer and the scale of the instrument may be observed. In such an instrument, the pointer is displaced substantially from the window. This displacement is provided for various reasons. For example, the spacing of the pointer from other parts of the instrument is required for mechanical clearance to permit relative movement between the pointer and associated parts of the instrument. Furthermore, the transparent window employed in conventional instruments is subject to the collection of substantial static charges. Such static charges affect the position of the pointer as a function of the distance between the pointer and the window. In order to minimize the effect of static charges on the pointer, a substantial spacing between such a window and the pointer is desirable.

It will be appreciated that an indicating instrument may be viewed from various angles, and that it should be readily readable from all such angles. The primary purpose of the instrument is to convey information accurately and conveniently to the observer. Interference with the readability of the instrument is highly objectionable.

Because of the spacing of the pointer and the scale element at a substantial distance from the transparent window, appreciable difficulty has been encountered due to shadows cast on the scale element and the pointer. The shadows are particularly objectionable in instruments mounted on panels or switchboards for the reason that such instruments cannot necessarily be conveniently positioned to minimize shadows. However, the shadows are also objectionable in portable instruments.

In order to minimize the formation of shadows on the pointer and the scale element of an indicating instrument, the instrument has been provided with a cup-shaped molded window. Since the rim of the cup-shaped window is also transparent, shadows should not be cast by the rim on the pointer and scale element. This solution has not been satisfactory for a number of reasons. Since plastics available for transparent windows are physically soft, they are readily scratched, and for this reason are not suitable for instrument windows. Furthermore, plastics conventionally available accumulate static charges which are even larger than those encountered in glass. As previously pointed out, static charges adversely affect the operation of the pointer. For these and other reasons, it has been the practice to manufacture the cup-shaped window by molding glass into the desired configuration.

The molded cup-shaped glass window employed for indicating instruments has a number of objectionable features. It has been found impossible to mold glass into the desired configuration without producing substantial ripple in the surface of the glass. The rippled surface appreciably reduces the readability of the instrument. The rippled surface also distorts the scale and adds to the problem of reflected light. No practicable method is known for eliminating the ripples from such a cup-shaped molded glass window.

A further objection to the molded glass window resides in the requirement that such a window have rounded edges. The rounded edges tend to reflect light in a plurality of paths and such reflected light also reduces the readability of the instrument.

It also may be pointed out that glass is frangible material. If a cup-shaped glass window is provided, the total glass surface is materially increased and breakage during the manufacture, shipping and use thereof is similarly increased.

In accordance with the invention, the scale for an indicating instrument extends between the plane in which the pointer moves and the associated window. One edge of the scale element is located adjacent the path of the pointer to eliminate parallax errors. The remaining edge of the scale element is positioned adjacent to the instrument window.

Although the scale element may have various configurations such as those corresponding to various curved surfaces of revolution, it has been found particularly desirable to construct the scale element substantially as a segment of the frustum of a right circular cone. The invention in effect moves the scale element towards the window and materially reduces the shadows cast on the scale element. At the same time, no additional space is required and the necessary clearances between the pointer and the window are not reduced.

The invention further contemplates the provision of an area of contrast surrounding the scale markings. This area preferably is similar to the background color of the scale element.

Although a conventional window may be employed with a scale element and pointer designed in accordance with the invention, the invention permits the adoption of a cup-shaped window of reduced height. The invention contemplates the construction of such a window from a plane sheet of glass having a molded ring of light-permeable material surrounding the glass. The light-permeable material may be constructed of glass having a melting point lower than that of the plane sheet and is molded directly to the plane sheet. In a preferred embodiment of the invention, the ring is constructed of a light-permeable plastic which is molded directly in engagement with the plane sheet of glass. Such a ring may be provided with a sharp corner to minimize the range of reflection of light therefrom. The invention permits the use of a central plane sheet of glass having a polished surface which is free from ripple.

It is, therefore, an object of the invention to provide an indicating instrument of improved readability.

It is an object of the invention to provide an indicating instrument having a scale element and a pointer movable relative to the scale element, the scale element having a surface inclined relative to the plane within which the pointer is movable.

It is an additional object of the invention to provide a scale element having increased contrast between the scale markings and the background employed for the scale markings.

It is a further object of the invention to provide a cup-shaped window for an indicating instrument wherein the window has an angular edge.

It is a still further object of the invention to provide a cup-shaped transparent window for an indicating instrument constructed with a glass center and a molded light-permeable edge.

It is another object of the invention to provide an improved method for making a cup-shaped window for an indicating instrument.

Other objects of the invention will be apparent from the following description taken in conjunction with the accompanying drawing, in which.

Figure 4:
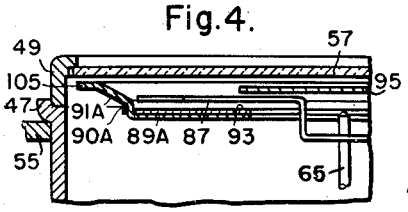
Figure 5:
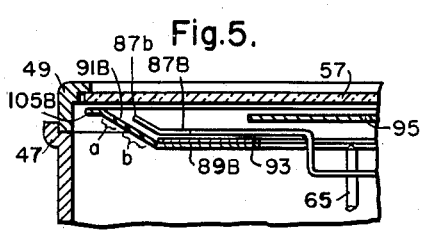
Figure 6:
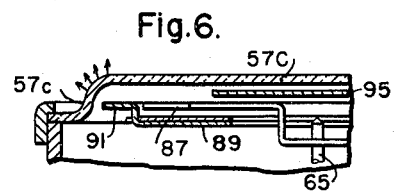
Figure 3:
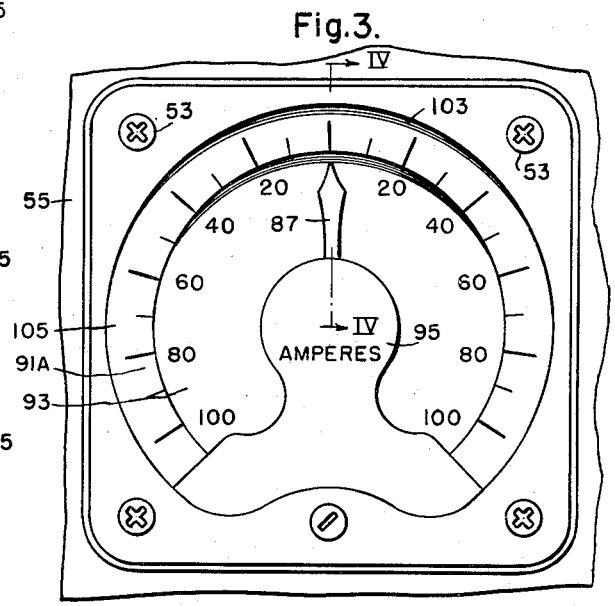
Figure 7:
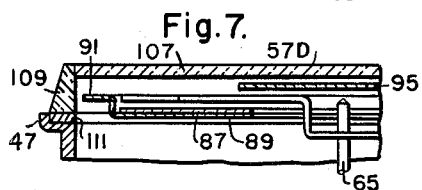
Figure 8:
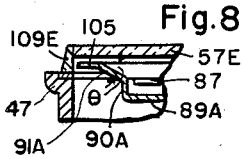

Fig. 3 is a view in front elevation of a measuring instrument embodying the invention, Fig. 4 is a view in section taken along the line IV—IV of Fig. 3, Fig. 5 is a view in section with parts broken away showing a modified form of an instrument embodying the invention, Fig. 6 is a view in section with parts broken away of a prior art measuring instrument, and Figs. 7 and 8 are views in section with parts broken away of measuring instruments embodying modifications of the invention.

Figure 2:
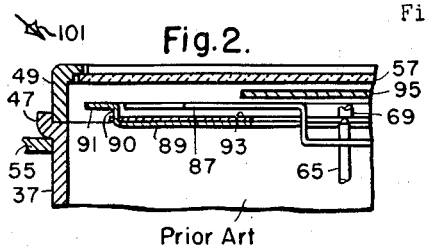
Fig. 2 is a view in section taken along the line II—II of Fig. 1.
Figure 1:
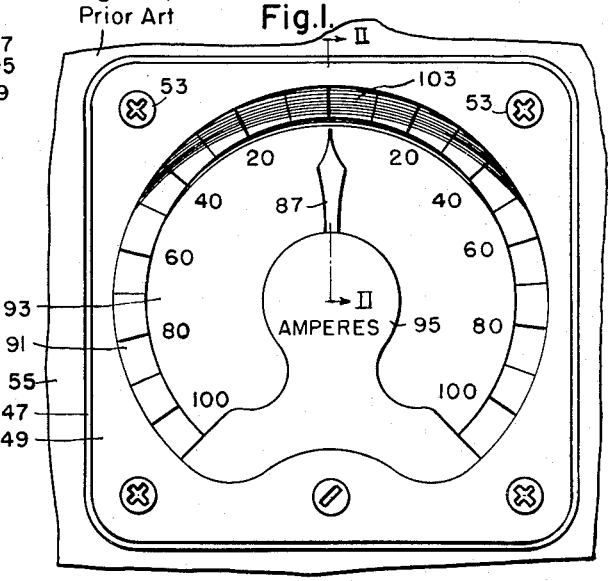
Figure 1 is a view in front elevation of a prior art measuring instrument.

Referring to the drawing, Figs. 1 and 2 show a conventional measuring instrument which is similar to the instrument illustrated in the V. S. Thomander Patent 2,389,393 which issued November 20, 1945. With the exception of the reference character 90, all of the reference characters appearing in Figs. 1 and 2 designate the same parts in applicant's drawing and in the Thomander patent. Although the construction and operation of the instrument of Figs. 1 and 2 may be ascertained from the Thomander patent, a brief review of the construction is herein set forth.

The instrument movement of Figs. 1 and 2 is enclosed within a casing which includes a cylindrical shell 37. This shell has a flange 47 of rectangular outline for reception of a cap 49. The cap may be secured to the flange 47 by means of machine screws 53.

The instrument of Figs. 1 and 2 may be employed as a portable instrument but is illustrated as mounted on a panel 55 which may be a switchboard panel. The panel has an opening through which the cylindrical shell 37 extends. The cap 49 has a transparent window 57 through which parts of the instrument may be observed.

The instrument movement includes a shaft 65 which is mounted for rotation relative to the casing by means of suitable bearings including the bearing screw 69. The shaft 65 has secured thereto a pointer 87 which has a portion operating over a ring-shaped dial member 89. The dial member has a peripheral rim 91 which is located substantially in the plane of the pointer 87. This rim has scale markings or scale divisions applied thereto. A dial plate 93 is located on a recessed portion of the dial member 89. The plate 93 has numbers corresponding to various points on the scale. A mask plate 95 is provided to cover the opening in the dial member 89 through which the pointer 87 passes. Although a "center-zero" instrument is illustrated, the invention is applicable to instruments having any desired zero position of the pointer and to "suppressed-zero" instruments. The invention is particularly suited for instruments having a pointer movable through a large angle, such as one in excess of 180°. However, the invention also is desirable for instruments having a smaller pointer movement. For a complete discussion of the instrument, reference may be made to the aforesaid Thomander patent. In order to simplify the presentation, most of the instrument movement is not shown in the present drawing.

In order to assist in the following discussion, a reference character 90 has been added to designate a cylindrical wall which connects the rim 91 to the remainder of the dial member 89.

It will be noted that the pointer 87 and the rim 91 supporting the scale markings are in substantially the same plane for the purpose of eliminating parallax error. It will be noted further that these parts are spaced appreciably from the window 57. As previously pointed out, this spacing is employed for mechanical clearance and to reduce the effect on the pointer 87 if static charges collected by the window 57. The cap 49 with the window 57 may be removed from the remainder of the instrument without disturbing the pointer or dial member 89.

Because of the spacing between the rim 91 and the pointer 87 from the window 57, the lighting of these parts is dependent to a substantial extent on the direction of illumination of the instrument. For example, let it be assumed that light reaches the instrument in the direction of the arrow 101 (Fig. 2). By inspection of Fig. 2, it is clear that a substantial part of the rim 91 has a shadow cast thereon. This shadow is represented in Fig. 1 by a shaded area 103. The shaded area makes a substantial part of the scale markings virtually invisible. Furthermore, the specific portion of the scale markings rendered invisible depends on the direction of illumination of an instrument. Since the instrument is mounted in a fixed position on the panel 55, the instrument cannot be adjusted to reduce the amount of shadow.

The shadow area may be materially reduced by replacing the dial member 89 of Fig. 2 by the dial member 89A illustrated in Fig. 4. The dial member 89A includes a cylindrical wall 90A which corresponds to the cylindrical wall 90 of Fig. 2. However, the peripheral rim 91 of Fig. 2 is replaced in Fig. 4 by a scale element or rim 91A which is inclined to extend between the plane in which the pointer 87 operates and the window 57. The inclination may be along a curved path, such as that represented by a curved surface of revolution. However, a preferred construction employs a peripheral rim 91A which is substantially a segment of a frustum of a right circular cone. It will be noted that the smaller diameter edge of the segment is substantially in the plane in which the pointer 87 rotates. Consequently, parallax errors are substantially eliminated. The larger diameter edge of the segment 91A is adjacent the window 57. This construction, in effect, moves the peripheral rim 91A towards the window 57 and materially reduces shadows cast on the rim. It should be noted further that the revised construction of the peripheral rim which carries the scale markings does not reduce the working clearances of relatively movable parts and does not require additional space.

Although the inclination of the scale element results in an improvement in the readability of the instrument, a further improvement may be effected by surrounding the scale markings by a continuous area of contrasting color preferably similar to the background color of the scale element. Such an area may be produced by terminating the scale markings short of the upper edge (as viewed in Fig. 4) of the segment 91A. However, in the embodiment of Figs. 3 and 4, a separate flange 105 is provided which projects from the larger diameter edge of the segment 91A. It will be observed that the flange 105 is substantially parallel to the window 57 and that it is adjacent the window.

As more particularly shown in Fig. 3, the flange 105 provides an area surrounding the scale markings which has the same color as the background color of the scale element. In a preferred embodiment of the invention, the mask 95, the plate 93, the segment or rim 91A and the flange 105 all have the same color. The scale markings and the numerals associated with the scale are printed or otherwise applied in a contrasting color. The pointer 87 may have a color similar to that employed for the pointer and the scale markings.

It has been found that the instrument of Fig. 3 has far greater readability than that of Fig. 1. Not only is it relatively free of objectionable shadows but the contrast provided by the flange 105 causes the scale markings to stand out much more clearly than those illustrated in Fig. 1.

In the modification of Fig. 5, a dial member 89B is employed in place of the dial member 89A of Fig. 4. The dial member 89B is similar to that of Fig. 4, except for the extension of the segment or rim 91A of Fig. 4 to provide a larger segment or rim 91B which underlies the tip or end of a pointer 87B. This pointer corresponds to the pointer 87 of Fig. 4. It will be noted that the segment 91B has eliminated the cylindrical wall 90A of Fig. 4.

The pointer 87B may be similar in construction to the pointer 87 of Fig. 4, but an alternative construction is illustrated in Fig. 5. As shown in Fig. 5, the pointer 87B has a tip or end 87b which overlies and is parallel to a portion of the segment or rim 91B. The dial member 89B also has associated therewith a flange 105B which corresponds to the flange 105 of Fig. 4.

The scale markings are applied to the segment 91B. If desired, the scale markings may be applied to the portion b of the segment 91B. When so applied, the tip 87b of the pointer overlies the markings and some parallax errors may be introduced. Alternatively, the scale markings may be applied to the portion a of the segment 91B. In this case parallax errors would be substantially reduced. Alternatively, the scale markings may extend over both of the areas a and b.

In the embodiments thus far considered, a plane glass window is secured to a cap 49 which may be constructed of an opaque material. Fig. 6 illustrates a different window construction which has been employed in the prior art. As shown in Fig. 6, a window 57C of cup shape is molded from a transparent material such as glass. This window has a wall portion 57c which admits light to the scale element or rim 91. This construction materially reduces the shadows cast on the scale element and the pointer 87. However, as pointed out previously, the window 57 when molded in a cup shape from glass has objectionable ripples. In addition, it has been found necessary to mold such a cover with a rounded corner which tends to reflect incident light in various directions, as shown by arrows in Fig. 6. An additional objection resides in the fact that additional breakage of glass may be expected during the manufacture, shipment and use of the instrument because of the larger glass area provided.

In Fig. 7, a window 57D of cup shape replaces the window 57C of Fig. 6. The window 57D is constructed of a sheet 107 of plane glass which has secured to its edge a ring 109 of light-permeable material. Although the ring 109 may be molded directly in engagement with the sheet 107 from glass having a lower melting point than that employed for the sheet 107, in a preferred embodiment of the invention, the ring 109 is molded from a plastic transparent material. Such materials are well known in the art. For example, a polymethylmethacrylate, polystyrene, polymers of acrylic acid and acid esters, or other transparent materials may be employed. Such materials may be molded directly in engagement with the sheet 107 of plane glass. The sheet 107 is of polished construction and is free from ripple. At the same time, the plastic ring 109 may be molded with a sharp angular edge which is incapable of reflecting incident light in various directions. If desired, the ring 109 may be molded into a configuration suitable for replacing the entire cap 49 of Figs. 1 to 5. However, in Fig. 7 it is assumed that the ring 109 is cemented or molded directly to a base element 111 which may be a metallic plate providing a suitable configuration for reception in the flange 47.

In Fig. 8, a cup-shaped window is shown associated with the dial member 89A. This dial member was discussed in the discussion of Fig. 4. By inspection of Fig. 8, it will be observed that the flange 105 is positioned adjacent the window. For this reason the cup-shaped window 57E employed in Fig. 8 may be made substantially more shallow than that 57D employed in the embodiment of Fig. 7. Consequently, the plastic ring 109E employed for the cup-shaped window of Fig. 8 may be substantially shorter than the ring 109 employed in the embodiment of Fig. 7.

The angle of inclination of the scale element relative to the window may vary appreciably, but preferably is substantially less than 45°. Thus, in Fig. 8 an angle $\theta$ of the order of 20° has been found to improve markedly the readability of the instrument.

The instrument illustrated in the drawing has a pointer movable through an angle in excess of 250°. With this long angular movement and the long arcuate scale required, it is difficult to avoid the formation of shadows in many installations on some part of the scale in prior art instruments. The invention is particularly helpful for such instruments, but also is desirable for instruments having smaller pointer movements.

Although the invention has been described with reference to certain specific embodiments thereof, the numerous modifications falling within the spirit and scope of the invention are possible.

I claim as my invention:

1. In an electrical measuring instrument, a supporting structure including a window, a pointer positioned for observation through said window, means mounting the pointer for movement relative to the supporting structure through a predetermined path adjacent to said window, a scale element secured on the supporting structure independently of the window and positioned adjacent the path of travel of an end of the pointer for observation through said window, said scale element having a surface defined by movement with the pointer of a line positioned at an oblique substantially similar angle relative to the window and relative to the pointer.

2. An electrical measuring instrument comprising a supporting structure including a substantially plane window, a pointer positioned for observation through said window, means mounting the pointer for movement relative to the supporting structure, said pointer having an end movable in a plane spaced from and parallel to the plane of the window relative to the supporting structure through a predetermined path adjacent to said window, a scale element independent of the window and positioned adjacent the path of travel of said end of the pointer for observation through said window, said pointer being movable relative to the scale element and said scale element extending substantially between said planes.

3. An electrical measuring device comprising a supporting structure including a window, a pointer positioned for observation through said window, means mounting the pointer for rotation about an axis relative to the supporting structure through a predetermined path adjacent to said window, a scale element independent of the window and positioned adjacent the path of travel of an end of the pointer for observation through said window, said pointer being rotatable about said axis relative to the scale element, said scale element being a segment of a frustum of a hollow right circular cone having an axis coinciding with said first-named axis, said segment having its smaller diameter edge adjacent the path of travel of the end of the pointer and having its larger diameter edge adjacent the window, said larger diameter edge being closer to the window than to the plane in which the pointer rotates.

4. A measuring device as claimed in claim 3, wherein the scale element has all scale markings spaced from the large diameter edge of the scale element by a substantial distance, said distance being exposed for observation through the window.

5. A measuring device as claimed in claim 3, wherein the pointer end overlies the segment, said end being substantially parallel to the adjacent surface of the segment.

6. A measuring device as claimed in claim 3 wherein said scale element has scale markings and a contrasting background exposed through the window, in combination with a flange extending from the larger diameter edge of the segment substantially parallel to the window, said flange having a continuous surface differing in color from the scale markings exposed for observation through the window, whereby the scale markings contrast both with the exposed continuous surface and with said background.

7. A measuring device as claimed in claim 3 in combination with a dial plate having a substantially plane surface parallel to and spaced from said window, the pointer having a portion positioned between the dial plate and the window, and a cylindrical wall connecting the dial plate to the smaller diameter edge of the segment, said dial plate having indicia thereon cooperating with the scale element.

8. A measuring device as claimed in claim 7 wherein the scale element has scale markings thereon, in combination with a flange extending from the larger diameter edge of the segment substantially parallel to the window, said flange being exposed for observation through the window, said flange, wall and dial plate all having a common color contrasting with the color of the pointer and scale markings.

9. In a panel-mounted electrical measuring device, a supporting structure including a plane window, a dial plate parallel to and spaced from the window, a pointer having a portion mounted for rotation between the window and the dial plate in a plane parallel to the window through an angle in excess of 180°, and a scale element positioned between the dial plate and the window, said scale element being a segment of a frustum of a hollow right circular cone having an axis coinciding with the axis of rotation of the pointer, said segment having its larger diameter edge adjacent the window.

10. An electrical indicating instrument comprising a supporting structure, a plane glass window, a scale element positioned adjacent said window for observation therethrough, a pointer positioned adjacent the window for observation through the window, the pointer being mounted for movement relative to the scale element and window, and a separate light-permeable ring surrounding the glass window and spacing the window from the supporting structure, said ring comprising a material which may be molded into a ring form about the glass window for admitting light to the scale element and pointer, said ring and window providing a cup-shaped light-permeable assembly having an exposed edge which is substantially a circle.

11. The method of constructing a measuring instrument cover which comprises molding a light-permeable material in the form of a ring around a plane glass window to produce a cup-shaped resultant assembly having a well-defined, sharp junction between the wall and the bars of the cup-shaped window, and securing the ring to a base.

12. A scale assembly for a measuring instrument comprising a scale element in the shape substantially of a segment of a frustum of a hollow right circular cone, said scale element having scale markings on the inner surface thereof, a flange projecting from the larger diameter edge of the scale element in a plane substantially transverse to the axis of the scale element, and a cylindrical rim projecting from the smaller diameter edge of the scale element in a direction away from said plane, said scale element, flange and rim all having a common color forming a contrasting background for the scale markings.

13. An electrical measuring instrument comprising a supporting structure, an indicating member, means mounting the indicating member for rotation relative to the supporting structure about an axis in a predetermined arcuate path, a window secured to said supporting structure for permitting observation of the indicating member therethrough, and a scale element adjacent the arcuate path, said scale element being independent of the window and secured to the supporting structure independently of the window, said scale element cooperating with the indicating member for indicating the position of the indicating member relative to the scale element, and said scale element having a substantial portion positioned nearer than the arcuate path to the window.

14. An electrical measuring instrument comprising a supporting structure, an indicating member, means mounting the indicating member for rotation relative to the supporting structure about an axis in a predetermined arcuate path, a plane window spaced from said arcuate path and transverse to said axis, said window being secured to said supporting structure for permitting observation of the indicating member therethrough, and a scale element adjacent the arcuate path, said scale element being independent of the window and secured to the supporting structure independently of the window, said scale element being arcuate about said axis and cooperating with the indicating member for indicating the position of the indicating member relative to the scale element, and said scale element providing an arcuate surface extending substantially from said arcuate path to said window.

15. An electrical measuring instrument comprising a supporting structure, a pointer, means mounting the pointer for rotation about an axis relative to the supporting structure, said pointer having a tip portion spaced from the axis for movement about the axis in a predetermined arcuate path and an inner portion located between the tip portion and the axis for movement through an inner path, a window extending substantially parallel to said arcuate path for exposing said tip portion for observation, an arcuate scale element having an inner scale surface of revolution extending arcuately about said axis and extending substantially from the arcuate path to said window, the line of said surface cut by any plane containing the axis being spaced radially from the axis adjacent the window by a distance greater than the radial spacing of the line adjacent to the arcuate path, said surface having a background color and scale markings differing in color from the background color, a mask having an area extending over said inner path for full observation by a person examining the tip portion of the pointer through the window, said mask having substantially said background color, whereby the scale markings and the tip portion of the pointer may be observed through the window contrasting with a substantially uniform color.

16. An electrical measuring instrument comprising a supporting structure, a pointer, means mounting the pointer for rotation about an axis relative to the supporting structure, said pointer having a tip portion spaced from the axis for movement about the axis in a predetermined arcuate path and an inner portion located between the tip portion and the axis for movement through an inner path, a window extending substantially parallel to said arcuate path for exposing said tip portion for observation, an arcuate scale element having an inner scale surface of revolution extending arcuately about said axis and extending substantially from the arcuate path to said window, the line of said surface cut by any plane containing the axis being spaced radially from the axis adjacent the window by a distance greater than the radial spacing of the line adjacent to the arcuate path, said surface having a background color and scale markings differing in color from the background color, a scale-outlining section having an observable area extending substantially around the outer edge of said scale surface, said area having substantially said background color, a mask having an area extending over said inner path for full observation by a person examining the tip portion of the pointer through the window, said mask having substantially said background color, whereby the scale markings and the tip portion of the pointer may be observed through the window contrasting with a substantially uniform color.

17. An electrical measuring instrument comprising a supporting structure, a pointer, means mounting the pointer for rotation about an axis relative to the supporting structure through an angle in excess of 180°, said pointer having a tip portion spaced from the axis for movement about the axis in a predetermined arcuate path and an inner portion located between the tip portion and the axis for movement through an inner path, a window extending substantially parallel to said arcuate path for exposing said tip portion for observation, an arcuate scale element having an inner scale surface of revolution extending arcuately about said axis and extending substantially from the arcuate path to said window, said scale surface comprising substantially the inner surface of a segment of a frustum of a hollow right circular cone concentric about said axis for an angle in excess of 180° and having the larger diameter end adjacent said window, and having the smaller diameter end of the segment adjacent the arcuate path, said surface having a background color and scale markings differing in color from the background color, a mask having an area extending over said inner path for full observation by a person examining the tip portion of the pointer through the window, said mask having substantially said background color, whereby the scale markings and the tip portion of the pointer may be be observed through the window contrasting with a substantially uniform color.

18. An electrical measuring instrument comprising a supporting structure, a pointer, means mounting the pointer for rotation through an angle in excess of 180°, said pointer having a tip portion spaced from the axis for movement about the axis in a predetermined arcuate path and an inner portion located between the tip portion and the axis for movement through an inner path, a window extending substantially parallel to said arcuate path for exposing said tip portion for observation, an arcuate scale element having an inner scale surface of revolution extending arcuately about said axis and extending substantially from the arcuate path to said window, said scale surface comprising substantially the inner surface of a segment of a frustum of a hollow right circular cone concentric about said axis for an angle in excess of 180° and having the larger diameter end adjacent said window, and having the smaller diameter end of the segment adjacent the arcuate path, said surface having a background color and scale markings differing in color from the background color, a scale-outlining section having an area observable through said window extending substantially around the outer edge of the scale surface, said area having substantially said background color, a mask having an area extending over said inner path for full observation by a person examining the tip portion of the pointer through the window, said mask having substantially said background color, whereby the scale markings and the tip portion of the pointer may be observed through the window contrasting with a substantially uniform color, said scale element, scale-outlining section and mask being secured to the supporting structure independently of the window.

References Cited in the file of this patent

UNITED STATES PATENTS

| | | |
|---|---|---|
| 789,695 | Kempshall | May 9, 1905 |
| 1,976,938 | Hedeman | Oct. 16, 1934 |
| 1,999,073 | Awrey | Apr. 23, 1935 |
| 2,171,755 | Langsner | Sept. 5, 1939 |
| 2,186,451 | Dutcher | Jan. 9, 1940 |
| 2,389,393 | Thomander | Nov. 20, 1945 |
| 2,552,332 | Le Van | May 8, 1951 |
| 2,627,245 | Kimball | Feb. 3, 1953 |

FOREIGN PATENTS

| | | |
|---|---|---|
| 143,453 | Austria | Nov. 11, 1935 |
| 569,014 | Great Britain | May 1, 1945 |